(12) United States Patent
Gou et al.

(10) Patent No.: US 9,743,029 B2
(45) Date of Patent: Aug. 22, 2017

(54) ANALOG TO DIGITAL CONVERTING DEVICE FOR CONVERTING IMAGE SIGNAL

(71) Applicants: SK hynix Inc., Gyeonggi-do (KR); Industry-University Cooperation Foundation Hanyang University, Seoul (KR)

(72) Inventors: Ja Seung Gou, Seoul (KR); Oh Kyong Kwon, Seoul (KR); Min Kyu Kim, Seoul (KR)

(73) Assignees: SK Hynix Inc., Gyeonggi-do (KR); Industry-University Cooperation Foundation Hanyang University, Seoul (KR)

( * ) Notice: Subject to any disclaimer, the term of this patent is extended or adjusted under 35 U.S.C. 154(b) by 0 days.

(21) Appl. No.: 14/960,173

(22) Filed: Dec. 4, 2015

(65) Prior Publication Data

US 2017/0064236 A1    Mar. 2, 2017

(30) Foreign Application Priority Data

Aug. 31, 2015    (KR) .......................... 10-2015-0122357

(51) Int. Cl.
*H04N 5/378*    (2011.01)
*H04N 5/3745*    (2011.01)

(52) U.S. Cl.
CPC ........... *H04N 5/378* (2013.01); *H04N 5/3745* (2013.01); *H04N 5/37452* (2013.01)

(58) Field of Classification Search
CPC .. H04N 5/378; H04N 5/37452; H04N 5/3745; H01L 27/2445; H01L 27/14681; H01L 27/14614; H01L 27/14612; H01L 27/14609
See application file for complete search history.

(56) References Cited

U.S. PATENT DOCUMENTS

| 5,638,072 | A  | * | 6/1997 | Van Auken | ........... | H03M 1/804 341/141 |
| 6,198,313 | B1 | * | 3/2001 | Poucher | ................. | G11C 27/02 327/91 |
| 6,844,840 | B1 | * | 1/2005 | Melanson | ............... | H03M 1/46 341/155 |
| 9,264,634 | B2 | * | 2/2016 | Oike | ..................... | H03M 1/186 |
| 9,450,596 | B2 | * | 9/2016 | Kim | ...................... | H04N 5/378 |
| 2012/0218235 | A1 | * | 8/2012 | Peng | .................... | G09G 3/3688 345/204 |
| 2012/0249851 | A1 | * | 10/2012 | Martinussen | .......... | H04N 5/378 348/308 |
| 2012/0287316 | A1 | * | 11/2012 | Kim | ...................... | H04N 5/378 348/294 |

FOREIGN PATENT DOCUMENTS

| KR | 1020100084746 | 7/2010 |
| KR | 1020110104178 | 9/2011 |
| KR | 1020140119978 | 10/2014 |

\* cited by examiner

*Primary Examiner* — Lin Ye
*Assistant Examiner* — Chriss Yoder, III
(74) *Attorney, Agent, or Firm* — IP & T Group LLP

(57) ABSTRACT

An analog to digital converting device includes an analog to digital converting unit suitable for converting an image signal into a digital signal; and a digital arithmetic unit suitable for calculating a difference between a reset voltage and a signal voltage, which correspond to the digital signal.

11 Claims, 5 Drawing Sheets

ANALOG TO DIGITAL CONVERTING DEVICE FOR CONVERTING IMAGE SIGNAL

CROSS-REFERENCE TO RELATED APPLICATIONS

The present application claims priority of Korean Patent Application No. 10-2015-0122357, filed on Aug. 31, 2015, which is incorporated herein by reference in its entirety.

BACKGROUND

1. Field

Exemplary embodiments of the present invention relate to an analog to digital converting device, and more particularly, to an analog to digital converting device for converting an image signal into a digital signal.

2. Description of the Related Art

An analog to digital converter converts an analog signal into a digital signal. The analog to digital converter is necessarily used in a device for processing a digital signal, for example, an image sensor which receives an optical signal from outside, converts the received signal into a digital signal, and processes the digital signal. That is, the image sensor includes a pixel array for receiving an optical signal, and analog to digital converters provided at each column of the pixel array.

The image sensor additionally includes a capacitor for removing an offset voltage of a comparator, flicker noise, and noise contained in the reset voltage of pixel output, and stores the reset voltage of the pixel output and the offset voltage in the capacitor.

A reference document, Korean Patent Publication No. 2011-0104178, describes a converter which includes a capacitor array to convert an analog signal into a digital signal.

SUMMARY

Various embodiments are directed to an analog to digital converting device that may exclude a separate capacitor for storing a reset voltage of a pixel signal and an offset voltage of a comparator.

Embodiments of the invention may include an analog to digital converting device including an analog to digital converting unit suitable for converting an image signal into a digital signal; and a digital arithmetic unit suitable for calculating a difference between a reset voltage and a signal voltage, which correspond to the digital signal.

DETAILED DESCRIPTION

Figure 1:
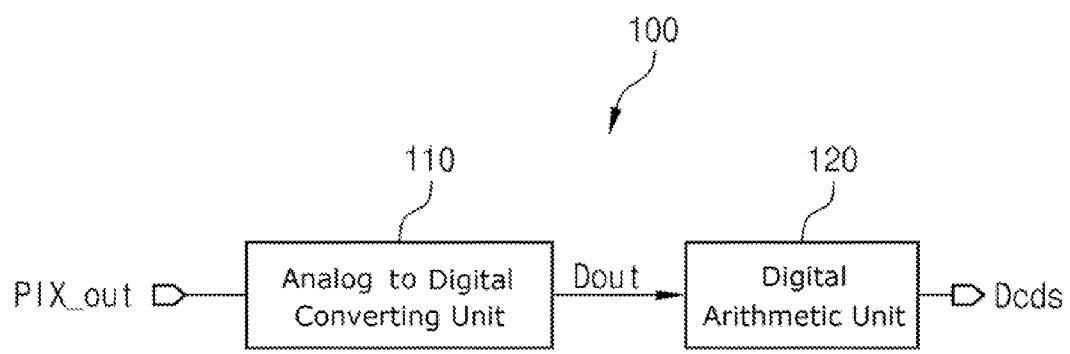
FIG. 1 is a block diagram illustrating an analog to digital converting device in accordance with an embodiment of the present invention.

Various embodiments will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

The drawings are not necessarily to scale and, in some instances, proportions may have been exaggerated to clearly illustrate features of the embodiments. It is also noted that in this specification, "connected/coupled" refers to one component not only directly coupling another component, but also indirectly coupling another component through an intermediate component. In addition, a singular form may include a plural form as long as it is not specifically mentioned.

FIG. 1 is a block diagram illustrating an analog to digital converting device 100 in accordance with an embodiment of the present invention. Referring to FIG. 1, the analog to digital converting device 100 may include an analog to digital converting unit 110 and a digital arithmetic unit 120.

The analog to digital converting unit 110 receives an image signal PIX_out from outside, for example, a pixel (see 400 of FIG. 4) of an image sensor, and converts the received image signal PIX_out into a digital signal Dout having direct current (DC) levels. The image signal PIX_out outputted from the pixel is an analog signal generated by converting light incident from outside into an electrical signal. The analog to digital converting unit 110 includes a successive approximation register (SAR) analog to digital converter. Since the SAR analog to digital converter converts one bit into a digital bit in response to one clock, the SAR analog to digital converter has high conversion speed and small power consumption.

The digital arithmetic unit 120 calculates a difference between two adjacent digital signals among the digital signals Dout outputted from the analog to digital converting unit 110. That is, the digital arithmetic unit 120 calculates a difference between a reset voltage and a signal voltage that correspond to the digital signal Dout outputted from the analog to digital converting unit 110. The digital arithmetic unit 120 may include digital correlated double sampling (CDS) logic for performing CDS. As the analog to digital converting device 100 includes the digital CDS logic, the analog to digital converting device 100 may remove an offset voltage of a comparator, flicker noise, and noise contained in the reset voltage of a pixel of an image sensor, for example, a CMOS image sensor (CIS).

Figure 2:
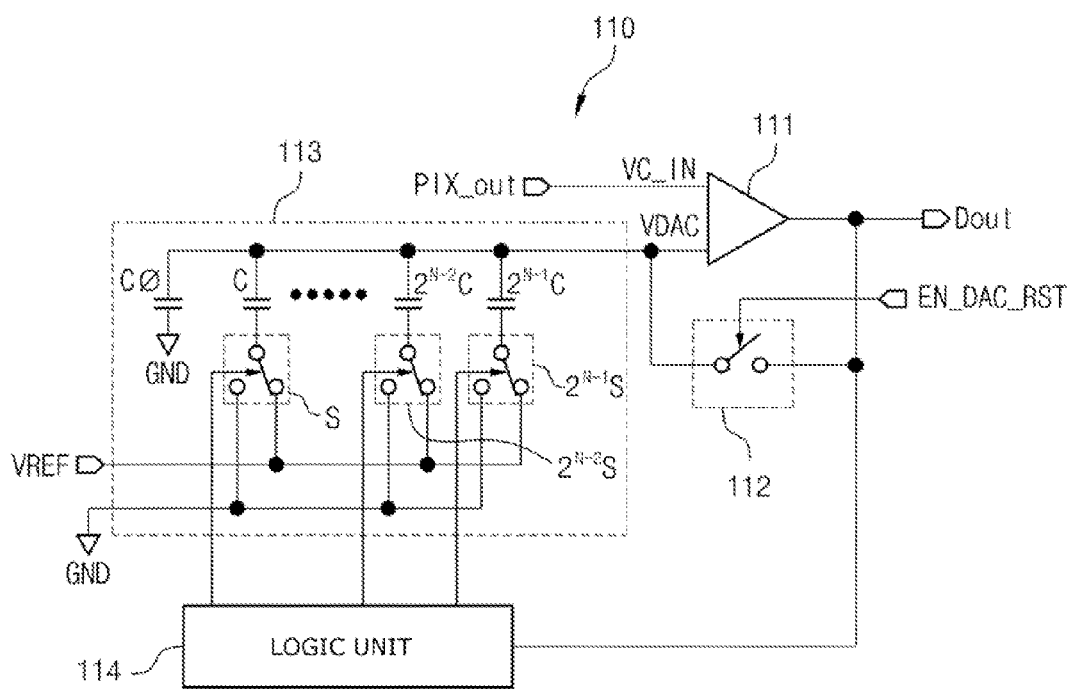
FIG. 2 is a detailed diagram of an analog to digital converting unit illustrated in FIG. 1.

FIG. 2 is a detailed diagram of the analog to digital converting unit 110 illustrated in FIG. 1. Referring to FIG. 2, the analog to digital converting unit 110 includes a comparator 111, a feedback unit 112, a digital to analog converting unit 113, and a logic unit 114.

The comparator 111 is coupled to a pixel (see 400 of FIG. 4) and the digital arithmetic unit 120. Specifically, the comparator 111 has first and second input terminals and an output terminal. The first input terminal is coupled to the pixel 400, the second input terminal is coupled to the digital to analog converting unit 113, and the output terminal is coupled to the digital arithmetic unit 120. Thus, the comparator 111 compares the voltage of the image signal PIX_out outputted from the pixel 400 to the output voltage of the digital to analog converting unit 113, and transmits the comparison results to the digital arithmetic unit 120.

The analog to digital converting unit 110 converts the reset voltage VRST and the signal voltage VSIG of the pixel 400 into digital signals.

The feedback unit 112 is coupled between the output terminal and the second input terminal of the comparator 111. The feedback unit 112 is enabled or disabled in response to a feedback control signal EN_DAC_RST. When the feedback unit 112 is enabled, the second input terminal of the comparator 111 is electrically coupled to the output terminal. When the feedback unit 112 is disabled, the second input terminal of the comparator 111 is electrically coupled to the digital to analog converting unit 113. The feedback unit 112 includes a switch which is turned on/off in response to the feedback control signal EN_DAC_RST. For example, the switch is turned on when the feedback control signal EN_DAC_RST is logic high, and turned off when the feedback control signal EN_DAC_RST is logic low.

The digital to analog converting unit 113 is coupled to the second input terminal of the comparator 111, the feedback unit 112, and the logic unit 114. The digital to analog converting unit 113 includes a base capacitor C0, a plurality of capacitors C to $2^{N-1}$C, and a plurality of switching elements S to $2^{N-1}$S. A first terminal of the base capacitor C0 is coupled to the second input terminal of the comparator 111, and a second terminal of the base capacitor C0 is grounded. The first terminals of the plurality of capacitors C to $2^{N-1}$C are coupled to the second input terminal of the comparator 111, and the second terminals of the plurality of capacitors C to $2^{N-1}$C are coupled to the plurality of switching elements S to $2^{N-1}$S. The capacitors C to $2^{N-1}$C are coupled in parallel to each other. The first terminals of the switching elements S to $2^{N-1}$S are coupled to the plurality of capacitors C to $2^{N-1}$C, and the second terminals of the switching elements S to $2^{N-1}$S are coupled to a first reference voltage VREF and a second reference voltage (e.g., a ground voltage GND). The switching elements S to $2^{N-1}$S couple the corresponding capacitors to the second reference voltage GND or the first reference voltage VREF under the control of the logic unit 114. Each of the switching elements S to $2^{N-1}$S may include at least one metal oxide semiconductor field effect transistor (MOSFET). The switching elements S to $2^{N-1}$S are turned on/off under the control of the logic unit 114.

The plurality of capacitors C to $2^{N-1}$C are sequentially coupled to the first reference voltage VREF or the second reference voltage GND according to the output of the comparator 111. For example, the plurality of capacitors C to $2^{N-1}$C are sequentially coupled to the first reference voltage VREF from the rightmost capacitor $2^{N-1}$C to the leftmost capacitor C shown in FIG. 2.

The logic unit 114 is coupled to the comparator 111 and the digital to analog converting unit 113. The logic unit 114 controls the digital to analog converting unit 113 according to the output of the comparator 111. That is, the logic unit 114 couples the plurality of capacitors C to $2^{N-1}$C to the first reference voltage VREF according to the output of the comparator 111. The logic unit 114 may include an SAR logic.

As described above, the reset voltage VRST and the signal voltage VSIG of the pixel (see 400 of FIG. 4) are inputted to the comparator 111, and the digital to analog converting unit 113 stores the reset voltage VRST of the pixel 400 and an offset voltage VOFF of the comparator 111 through a feedback loop of the comparator 111, which is formed through the feedback unit 112.

As such, the analog to digital converting device 100 may exclude a separate capacitor for storing the reset voltage VRST of the pixel 400 and the offset voltage VOFF of the comparator 111.

Thus, the size of the analog to digital converting device 100 may be reduced by the area occupied by the separate capacitor, and the convergence time of the output voltage of the pixel 400 may be reduced. Furthermore, it is possible to reduce a time required for the separate capacitor to store the reset voltage of the pixel 400 and the offset voltage of the comparator 111.

Furthermore, an error voltage may be removed by the operation of the digital arithmetic unit 120. The error voltage may occur because the output voltage of the digital to analog converting unit 113 does not sufficiently converge within a given time, due to the limit to the driving ability of a buffer (not illustrated) for supplying the first reference voltage and the resistance of a transmission line for transmitting the first reference voltage, when the reset voltage of the pixel 400 and the offset voltage of the comparator 111 are stored in the digital to analog converting unit 113. Thus, the analog to digital converting device may reduce the time required for the digital to analog converting unit 113 to store the reset voltage of the pixel 400 and the offset voltage of the comparator 111. Therefore, the analog to digital converting device may be easily used for fabricating a small-area readout circuit for a CIS, which has a column parallel SAR ADC embedded therein.

Figure 3:
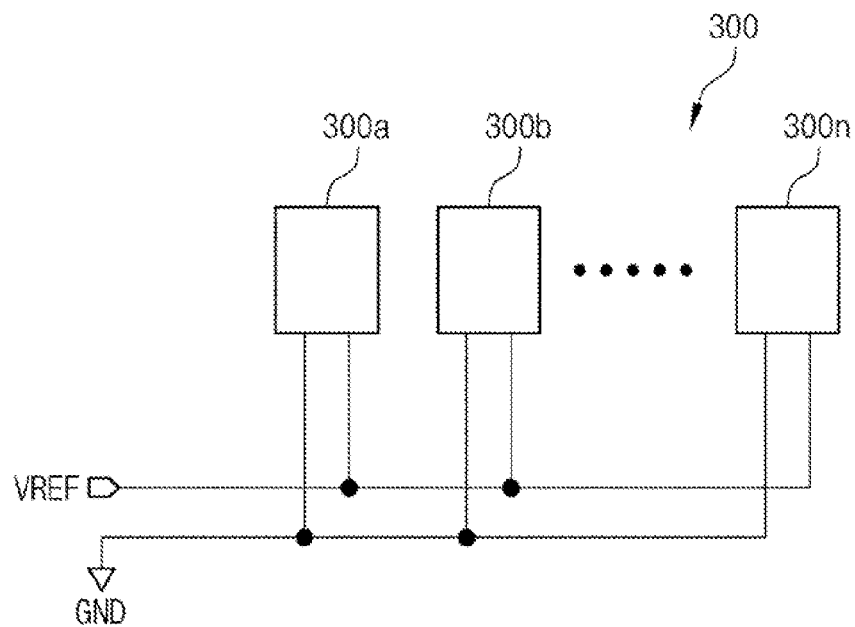
FIG. 3 is a block diagram illustrating a column parallel SAR analog to digital converting device.

FIG. 3 is a block diagram illustrating a column parallel SAR analog to digital converting device 300. As illustrated in FIG. 3, the column parallel SAR analog to digital converting device 300 includes a plurality of SAR analog to digital converting devices 300a to 300n. The SAR analog to digital converting devices 300a to 300n correspond to the analog to digital converting units 110, respectively, of FIGS. 1 and 2.

As such, a buffer (not illustrated) is used to supply the first reference voltage VREF to the plurality of SAR analog to digital converting devices 300a to 300n. The buffer must be able to supply the first reference voltage VREF to the plurality of SAR analog to digital converting devices 300a to 330n at the same time. However, it may take a long time to initialize the output of the digital to analog converting unit 113 to the first reference voltage VREF, due to the limit to the driving ability of the buffer and the resistance of the transmission line for transmitting the first reference voltage VREF.

Since the analog to digital converting device 100 does not include a separate capacitor for storing the reset voltage of the pixel 400 and the offset voltage of the comparator 111, the analog to digital converting device 100 may reduce the time required for initializing the outputs of the analog to digital converting units 110 to the first reference voltage VREF, the analog to digital converting units 110 being included in the respective analog to digital converting devices 300a to 300n of the column parallel SAR analog to digital converting device 300.

Figure 4:
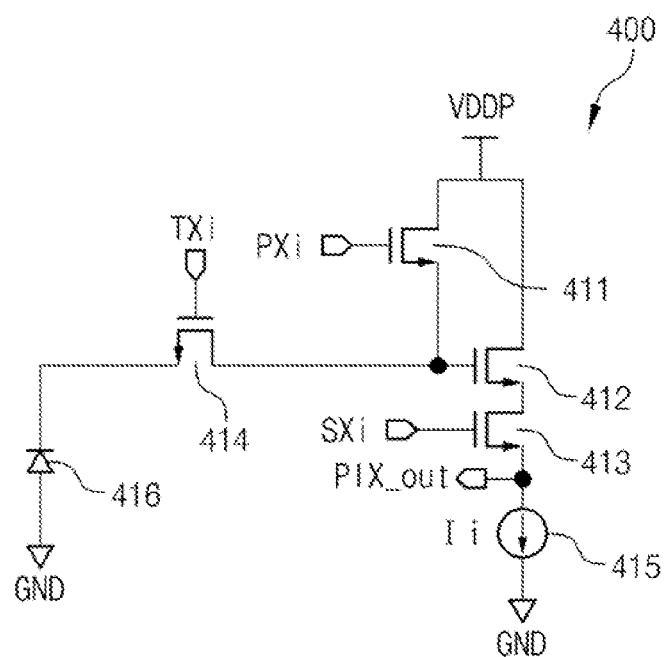
FIG. 4 is a circuit diagram illustrating an example of a pixel which supplies an image signal to the analog to digital converting device illustrated in FIG. 1.

FIG. 4 is a circuit diagram illustrating an example of the pixel 400 which supplies an image signal PIX_out to the analog to digital converting device illustrated in FIG. 1. Referring to FIG. 4, the pixel 400 includes a light receiving diode 416, four MOS transistors 411 to 414, and a current source 415.

The light receiving diode 416 receives light incident from outside, and converts the received light into an electrical signal.

The four MOS transistors 411 to 414 include a MOS transistor 411 which is turned on when a control signal PXi is activated, a MOS transistor 413 which is turned on when a control signal SXi is activated, a MOS transistor 414 which is turned on when a control signal TXi is activated, and a MOS transistor 412 which is turned on when an output signal of the MOS transistor 411 is activated. The MOS transistors 411 to 412 receive a supply voltage VDDP, and output the supply voltage VDDP when being turned on.

The output signal of the pixel 400 or the image signal PIX_out is outputted from the emitter of the MOS transistor 412.

The current source 415 constantly retains the output current of the MOS transistor 412.

Figure 5:
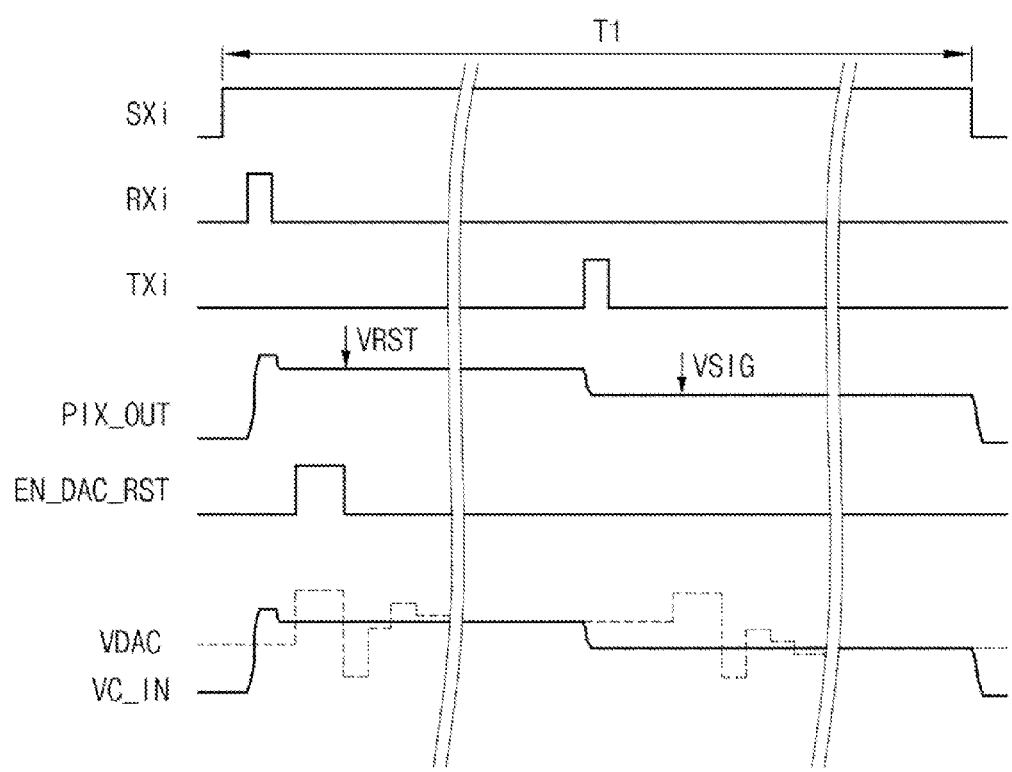
FIG. 5 is a waveform diagram for describing an operation of the analog to digital converting unit illustrated in FIG. 2.

FIG. 5 is a waveform diagram for describing an operation of the analog to digital converting unit 113 illustrated in FIG. 2. Referring to FIGS. 2 and 4, the operations of the signals illustrated in FIG. 5 will be described.

When a control signal RXi is activated to a logic high level in a state where the control signal SXi is activated to a logic high level, the image signal PIX_out outputted from the pixel 400 is outputted as the reset voltage VRST of the pixel 400. When the control signal TXi is activated to a logic high level, the image signal PIX_out is outputted as the signal voltage VSIG generated by light. The reset voltage VRST and the signal voltage SIG are sequentially outputted from the pixel 400 and inputted to the comparator 111. The image signal PIX_OUT outputted from the pixel 400 is inputted as an input voltage VC_IN of the comparator 111.

As the image signal PIX_out is inputted to the first input terminal of the comparator 111, the output voltage of the digital to analog converting unit 113, that is, the voltage inputted to the second input terminal of the comparator 111 has various types of waveforms as illustrated in FIG. 5.

FIGS. 6 to 9 are detailed diagrams for describing an operation of the analog to digital converting unit 110 illustrated in FIG. 2.

Figure 6:
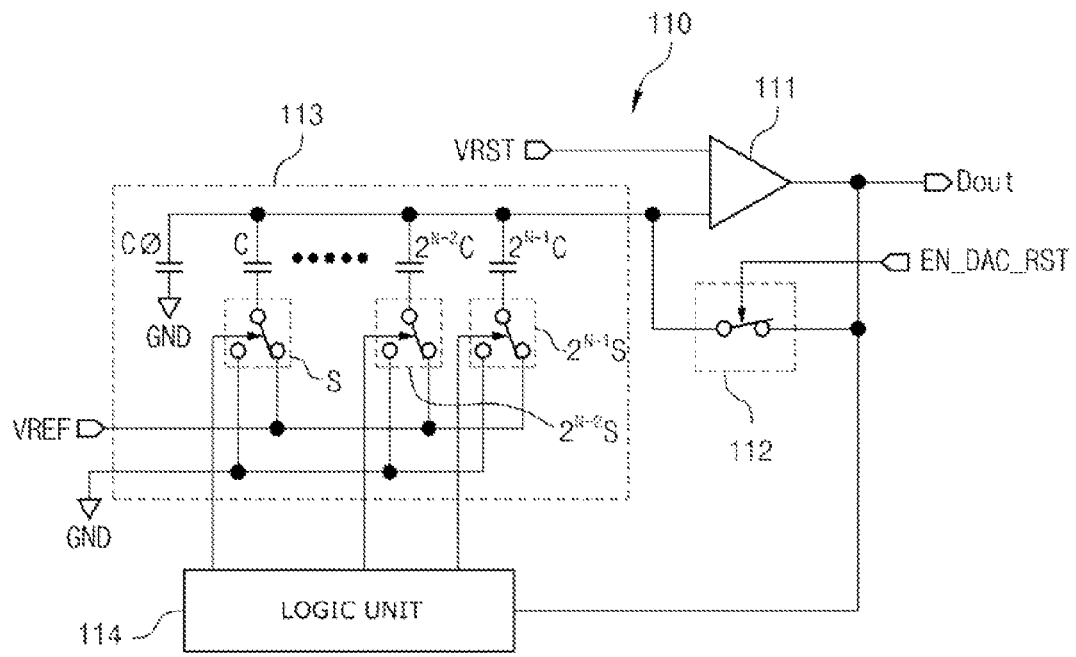
FIGS. 6, 7, 8, and 9 are circuit diagrams for describing an operation of the analog to digital converting unit illustrated in FIG. 2.

FIG. 6 illustrates the circuit configuration of the analog to digital converting unit 110 when the digital to analog converting unit 113 is initialized before first analog to digital conversion. When the digital to analog converting unit 113 is initialized before the first analog to digital conversion, the image signal PIX_out applied to the first input terminal of the comparator 111 is inputted as the reset voltage VRST. The second terminals of the capacitors C to $2^{N-1}$C included in the digital to analog converting unit 113 are coupled to the first reference voltage VREF. In this state, as the feedback control signal EN_DAC_RST is activated to a logic high level, the feedback unit 112 is enabled. Thus, the output signal of the comparator 111 and the output voltage of the digital to analog converting unit 113 are applied to the second input terminal of the comparator 111. Therefore, the voltage VDAC applied to the second input terminal of the comparator 111 becomes (VRST−VOFF+ΔV+VERR), where VOFF represents an offset voltage of the input terminal of the comparator 111, ΔV represents a specific voltage which is artificially applied, VERR represents an error voltage which occurs because the voltage VDAC does not sufficiently converge within a given time, due to the limit to the driving ability of the buffer (not illustrated) for supplying the first reference voltage VREF and the resistance of the transmission line for transmitting the first reference voltage VREF, while the plurality of capacitors C to $2^{N-1}$C are initialized at the same time.

Figure 7:
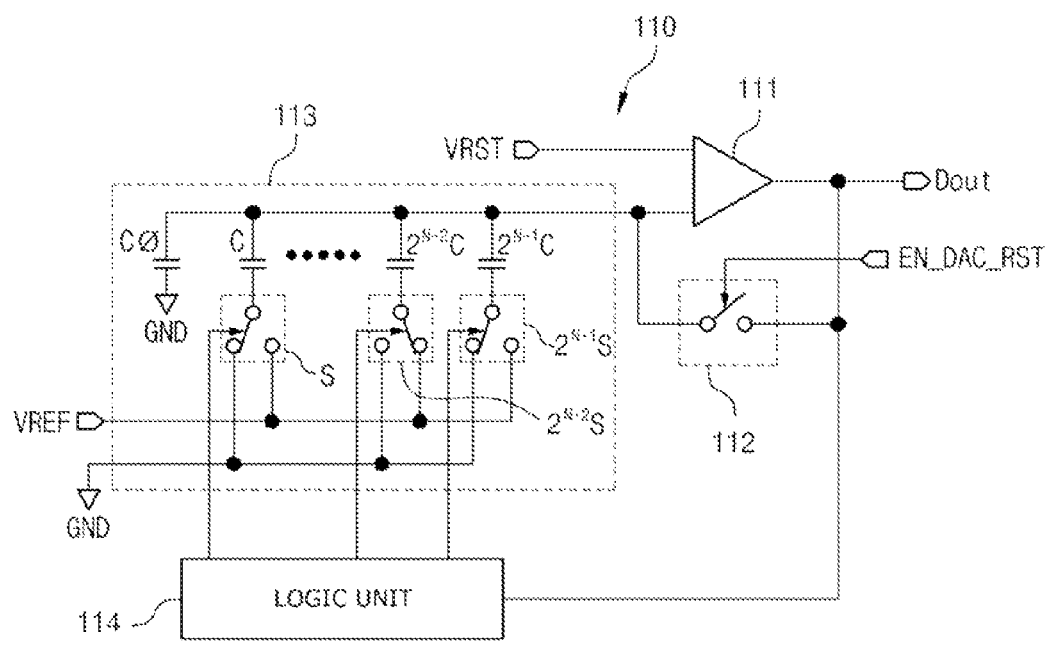

FIG. 7 illustrates the circuit configuration of the analog to digital converting unit 110 after the first analog to digital conversion. The capacitors C to $2^{N-1}$C of the digital to analog converting unit 113 are sequentially coupled to the first reference voltage VREF or the second reference voltage GND according to the comparison result of the comparator 111. Thus, the output voltage VDAC of the digital to analog converting unit 113 converges to (VRST−VOFF), and may be expressed as Equation 1 below.

$$VDAC = VRST - VOFF + \Delta V + \qquad \text{[Equation 1]}$$
$$VERR - \sum_{i=1}^{N}\left[D_{1st}[i]\left(\frac{VREF}{2}\right)^{i}\right] \cong VRST - VOFF$$

In Equation 1, $D_{1st}$ represents an i-th output of the comparator 111 during the first analog to digital conversion.

When Equation 1 is re-arranged, the result of the first analog to digital conversion may be expressed as Equation 2 below.

$$\sum_{i=1}^{N}\left[D_{1st}[i]\left(\frac{VREF}{2}\right)^{i}\right] \cong \Delta V + VERR \qquad \text{[Equation 2]}$$

Figure 8:
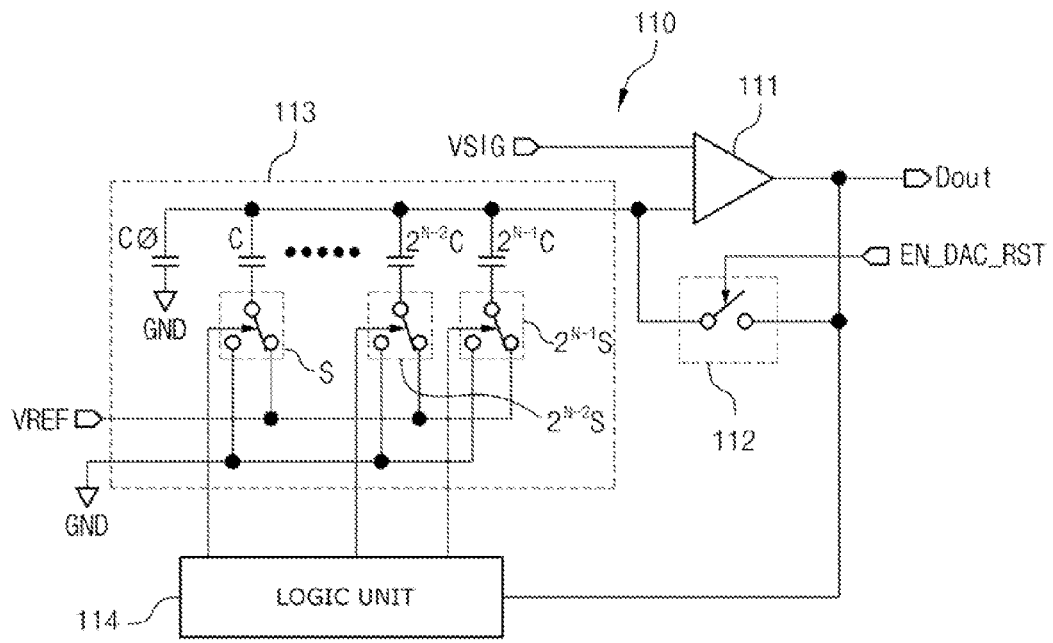

FIG. 8 illustrates the circuit configuration of the analog to digital converting unit 110 when the digital to analog converting unit 113 is initialized before second analog to digital conversion. When the digital to analog converting unit 113 is initialized before the second analog to digital conversion, the image signal PIX_out applied to the first input terminal of the comparator 111 is inputted as the signal voltage VSIG. The second terminals of the capacitors C to $2^{N-1}$C included in the digital to analog converting unit 113 are coupled to the first reference voltage VREF. In this state, as the feedback control signal EN_DAC_RST is deactivated to a logic low level unlike the feedback control signal EN_DAC_RST of FIG. 6, the feedback unit 112 is disabled. Thus, due to charge redistribution, the output voltage VDAC of the digital to analog converting unit 113 becomes the same voltage (VRST−VOFF+ΔV+VERR) as the output voltage of FIG. 6.

Figure 9:
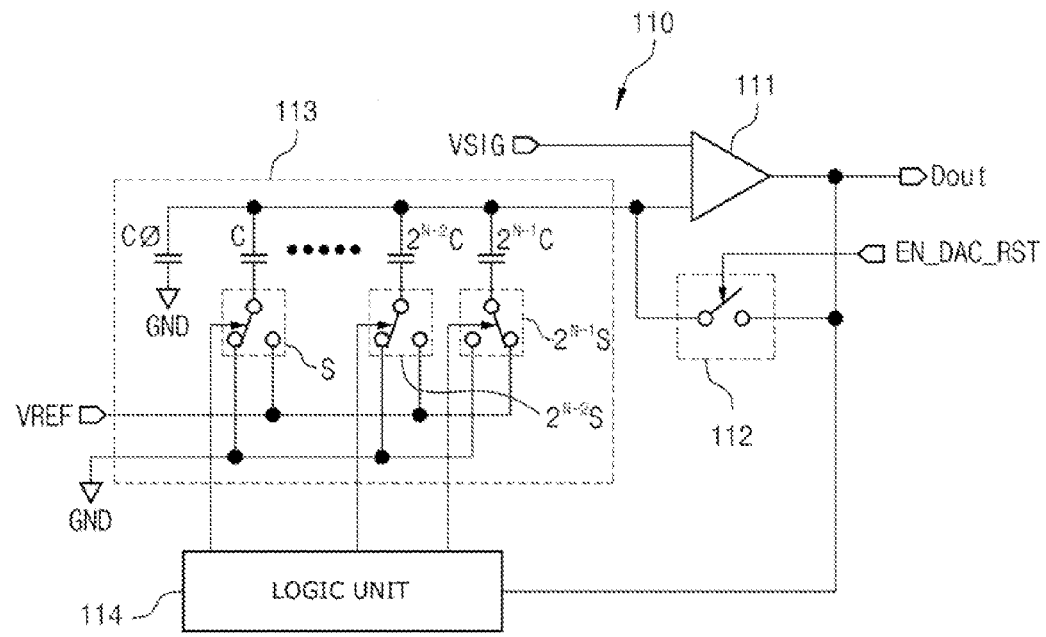

FIG. 9 illustrates the circuit configuration of the analog to digital converting unit 110 after the second analog to digital conversion. Like the first analog to digital conversion, the capacitors C to $2^{N-1}$C of the digital to analog converting unit 113 are sequentially coupled to the first reference voltage VREF or the second reference voltage GND according to the comparison result of the comparator 111. Thus, the output voltage VDAC of the digital to analog converting unit 113 converges to (VSIG−VOFF), and may be expressed as Equation 3 below.

$$VDAC = VRST - VOFF + \Delta V + \qquad \text{[Equation 3]}$$
$$VERR - \sum_{i=1}^{N}\left[D_{2nd}[i]\left(\frac{VREF}{2}\right)^{i}\right] \cong VSIG - VOFF$$

In Equation 3, $D_{2nd}$ represents an i-th output of the comparator 111 during the second analog to digital conversion.

When Equation 3 is re-arranged, the result of the second analog to digital conversion may be expressed as Equation 4 below.

$$\sum_{i=1}^{N} \left[ D_{2nd}[i] \left( \frac{VREF}{2} \right)^i \right] \cong VRST - VSIG + \Delta V + VERR \quad \text{[Equation 4]}$$

The logic unit 114 receives the output of the comparator 111, and subtracts the output $D_{1st}$ of the comparator 111, generated as the result of the first analog to digital conversion, from the output $D_{2nd}$ of the comparator 111, generated as the result of the second analog to digital conversion. Thus, the output signal DCDS of the logic unit 114 may be expressed as Equation 5 below, using Equations 2 and 4.

$$\sum_{i=1}^{N} \left[ DCDS[i] \left( \frac{VREF}{2} \right)^i \right] = \sum_{i=1}^{N} \left[ D_{2nd}[i] \left( \frac{VREF}{2} \right)^i \right] - \sum_{i=1}^{N} \left[ D_{1st}[i] \left( \frac{VREF}{2} \right)^i \right] \cong VRST - VSIG \quad \text{[Equation 5]}$$

In Equation 5, DCDS[i] represents an i-th output signal of the logic unit 114. Thus, the final output signal DCDS of the logic unit 114 indicates a difference between the reset voltage VRST and the signal voltage VSIG of the pixel output.

As such, the signal outputted from the analog to digital converting device has a value from which the voltage $\Delta V$ which is artificially applied during the digital calculation operation of the logic unit 114, the offset voltage VOFF of the comparator 111, and the error voltage VERR are removed. The error voltage VERR occurs because the output voltage of the digital to analog converting unit 113 does not sufficiently converge while the digital to analog converting unit 113 is initialized.

As described above, the analog to digital converting device 100 may exclude a separate capacitor for storing the output voltage of the pixel 400 and the offset voltage of the comparator 111. Thus, the area occupied by the separate capacitor and the convergence time of the output voltage of the pixel 400 may be reduced. Furthermore, the reset voltage of the image signal PIX_out outputted from the pixel 400 and the offset voltage of the comparator 111 are stored in the digital to analog converting unit 113. Thus, an error voltage may be removed by the operation of the logic unit 114, the error voltage occurring because the output voltage of the digital to analog converting unit 113 does not sufficiently converge within a given time due to the limit to the driving ability of the buffer (not illustrated) for supplying the first reference voltage VREF and the resistance of the transmission line for transmitting the first reference voltage VREF. Thus, the analog to digital converting device 100 may reduce the time required for the digital to analog converting unit 113 to store the reset voltage of the image signal PIX_out outputted from the pixel 400 and the offset voltage of the comparator 111. Therefore, the analog to digital converting device 100 may be easily used for fabricating a small-area readout circuit for a CIS, which has the column parallel SAR ADC embedded therein.

Although various embodiments have been described for illustrative purposes, it will be apparent to those skilled in the art that various changes and modifications may be made without departing from the spirit and scope of the invention as defined in the following claims.

What is claimed is:

1. An analog to digital converting device comprising:
   an analog to digital converting unit converting an image signal into a digital signal; and
   a digital arithmetic unit calculating a difference between a reset voltage and a signal voltage, which correspond to the digital signal,
   wherein the analog to digital converting unit comprises:
      a digital to analog converting unit including a plurality of capacitors selectively connected to a first reference voltage and a second reference voltage, and outputting an output voltage;
      a comparator comparing the image signal and the output voltage; and
      a feedback unit being activated when the reset voltage is applied as the image signal, and transmitting a voltage obtained by subtracting an offset voltage of the comparator from the reset voltage to the plurality of capacitors of the digital to analog converting unit,
      wherein the plurality of capacitors of the digital to analog converting unit stores the reset voltage and the offset voltage transmitted through the feedback unit when the reset voltage is applied as the image signal.

2. The analog to digital converting device of claim 1, wherein the analog to digital converting unit further comprises:
   a logic unit controlling the digital to analog converting unit to select one of the first and second reference voltages based on a comparison result of the comparator.

3. The analog to digital converting device of claim 2, wherein the digital to analog converting unit further comprises:
   a plurality of switching elements selectively coupling the respective capacitors to one of the first and second reference voltages under a control of the logic unit.

4. The analog to digital converting device of claim 3, wherein the image signal includes the reset voltage and the signal voltage, which are obtained by converting light incident from outside through a pixel, and
   when the reset voltage is applied as the image signal, the voltage obtained by subtracting the offset voltage of the comparator from the reset voltage of the pixel are stored in the plurality of capacitors.

5. The analog to digital converting device of claim 4, wherein, when the image signal is applied, the comparator sequentially compares the reset voltage and the signal voltage included in the image signal to the output voltage applied from the digital to analog converting unit, and outputs the comparison result.

6. The analog to digital converting device of claim 1, wherein the second reference voltage includes a ground voltage.

7. The analog to digital converting device of claim 1, wherein the image signal includes the reset voltage and the signal voltage, which are obtained by converting incident light through a pixel.

8. The analog to digital converting device of claim 1, wherein, when the digital to analog converting unit is initialized before a first analog to digital conversion, the reset voltage is applied as the image signal, the respective capacitors are switched to the first reference voltage, and the feedback unit which is activated for transmitting the voltage obtained by subtracting the offset voltage of the comparator from the reset voltage to the plurality of capacitors.

9. The analog to digital converting device of claim 8, wherein, after the first analog to digital conversion, the plurality of capacitors included in the digital to analog converting unit are sequentially coupled to the first or second reference voltage based on the comparison result.

10. The analog to digital converting device of claim 1, wherein, when the digital to analog converting unit is initialized before a second analog to digital conversion, the signal voltage is applied as the image signal, the respective capacitors are switched to the first reference voltage, and the feedback unit is disabled.

11. The analog to digital converting device of claim 10, wherein, after the second analog to digital conversion, the plurality of capacitors included in the digital to analog converting unit are sequentially coupled to the first or second reference voltage based on the comparison result.

* * * * *